United States Patent [19]

Hochrath

[11] 4,209,664
[45] Jun. 24, 1980

[54] CARRIER FREQUENCY SOUND TRANSMISSION SYSTEM

[75] Inventor: Hans Hochrath, Munich, Fed. Rep. of Germany

[73] Assignee: Siemens Aktiengesellschaft, Berlin & Munich, Fed. Rep. of Germany

[21] Appl. No.: 902,806

[22] Filed: May 4, 1978

[30] Foreign Application Priority Data

May 12, 1977 [DE] Fed. Rep. of Germany ....... 2721479

[51] Int. Cl.$^2$ ................................................ H04J 1/00
[52] U.S. Cl. ..................................... 179/2.51; 370/74
[58] Field of Search ........... 179/15 BP, 15 FD, 2.5 R

[56] References Cited

U.S. PATENT DOCUMENTS 2,613,279  10/1952  Hurault ........................... 179/15 BP

OTHER PUBLICATIONS

"Transmission Systems for Communications," Bell Telephone Laboratories, 1970, pp. 123–139.

Primary Examiner—James W. Moffitt
Assistant Examiner—Joseph A. Popek
Attorney, Agent, or Firm—Hill, Van Santen, Steadman, Chiara & Simpson

[57] ABSTRACT

A carrier frequency sound transmission system which utilizes sound channels which correspond approximately to the bandwidth of three separate telephone channels and wherein a pilot tone is added to each of the sound channels and four sound channels are transmitted on a suitable carrier to a receiver where the pilot tone is utilized as an automatic frequency control signal to control a local injection oscillator for demodulating the four incoming sound channels.

3 Claims, 3 Drawing Figures

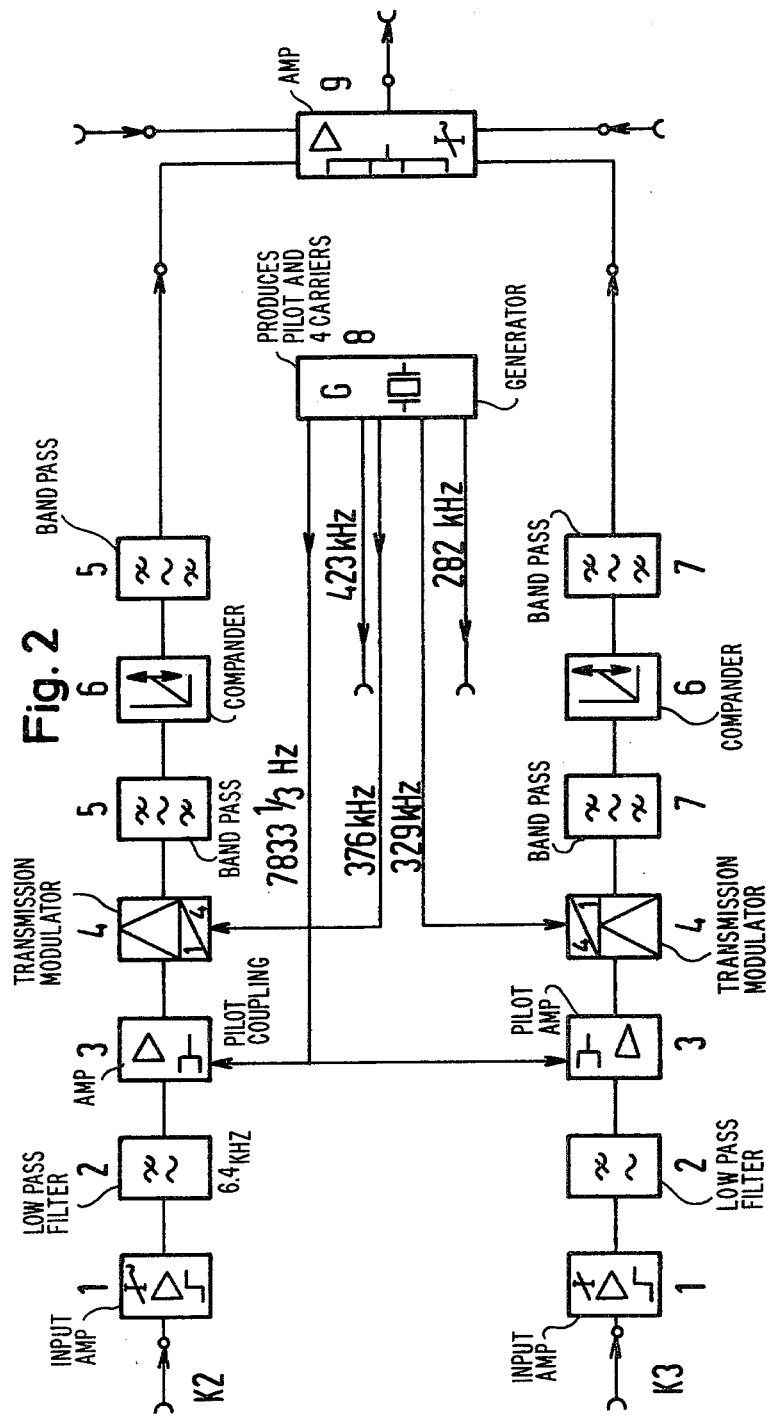

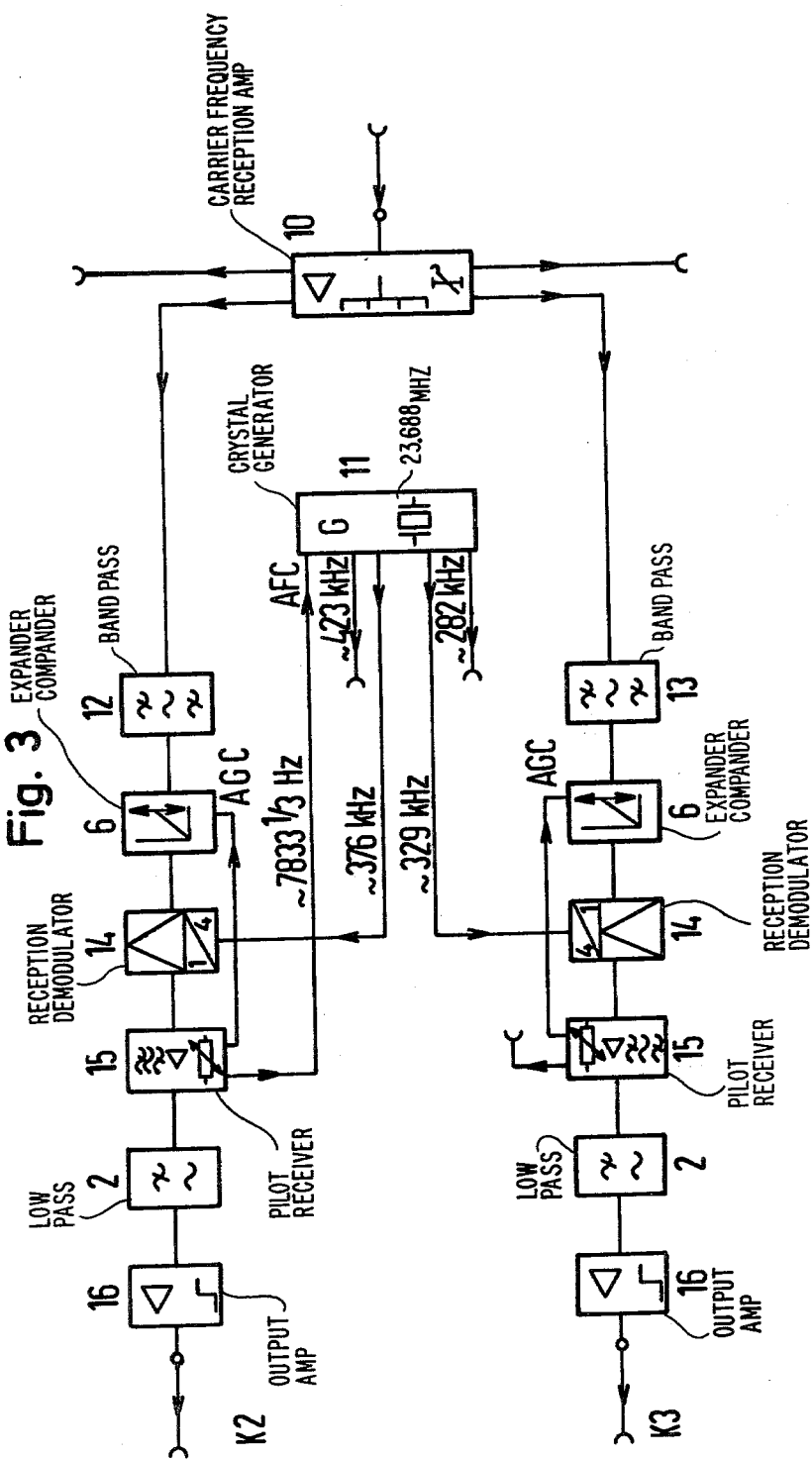

CARRIER FREQUENCY SOUND TRANSMISSION SYSTEM

FIELD OF THE INVENTION

The invention relates to a carrier frequency sound transmission system whose sound channel corresponds approximately to a band width of three telephone channels, and which lies in the band of the basic primary group of a carrier frequency communications transmission system.

DESCRIPTION OF THE PRIOR ART

According to experience the expense and space requirement of the equipment for the carrier-frequency transmission of sound programs is also determined, to a large degree, by the necessary filters and carrier supply devices. The necessary high quality can only be guaranteed if all known means are utilized for protection against impermissible noise and cross-talk values, level fluctuations and frequency shifts. In the previously customary transmission equipment the expense and space requirement was only able to be significantly lowered by doing without, for example, companders and pilot level regulation—with the disadvantages associated therewith, primarily for on-the-spot report transmissions with portable devices. At the present time it is desired in sound program transmission systems to differentiate between lines with 15 kHz band width and with nominally 5 kHz band width and it is desirable to provide new techniques for the carrier frequency transmission of sound channels.

SUMMARY OF THE INVENTION

It is the objective of the invention to create a carrier frequency sound transmission system, which can be operated quickly and simply, for the transmission into the primary group position of a carrier frequency system, which aforesaid system, while having sufficiently high tone quality is insensitive to interference and does not in the process interfere with the carrier frequency communications transmission system itself.

For the accomplishment of this objective the carrier frequency sound transmission system is embodied, according to the invention, in such a way that the band width of each sound channel amounts to about 7 kHz, that in each sound channel in the LF position a pilot is added above its sound frequency band, that each sound channel is converted into the carrier frequency position by means of identical quadrature modulators such as used in phase relationship single sideband systems and carrier frequencies are selected for conversion in such a way that in each transmission position all of a sound channel's signals coming to transmission have more than 1 kHz interval from the existing frequency band limits of the carrier frequency communications transmission system.

By means of these measures a quickly and simply operable carrier frequency sound transmission system, which is also inexpensive as well, is obtained, for 1 to 4 monophonic sound channels in a carrier frequency basic group with a greater sound frequency band width than 5 kHz, using three telephone channels per sound channel, with excellent suitability for rapid, portable uses.

In addition, this system can be constructed with simple coil band passes for the necessary selection of the individual carrier frequency sound channels.

All necessary pilots and carrier frequencies can be advantageously derived from a transmission-side quartz generator, with one of the derived pilots serving for synchronization for a further reception-side quartz generator.

In the case of transmisson of the sound channels in inverted position the carrier frequencies are advantageously selected at 70.5 kHz, 82.25 kHz, 94 kHz and 105.75 kHz, and frequency 7833⅓ Hz as pilot.

BRIEF DESCRIPTION OF THE DRAWINGS

FIG. 2 illustrates a transmitter according to the invention; and

FIG. 3 illustrates a receiver according to the invention.

DESCRIPTION OF THE PREFERRED EMBODIMENTS

Figure 1:
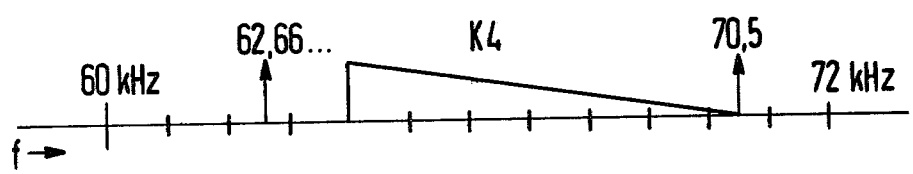
FIG. 1 illustrates the four carrier frequencies of the invention.
Figure 1:
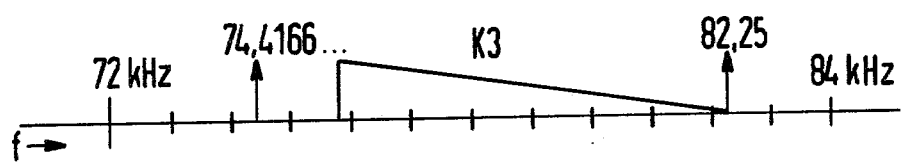
Figure 1:
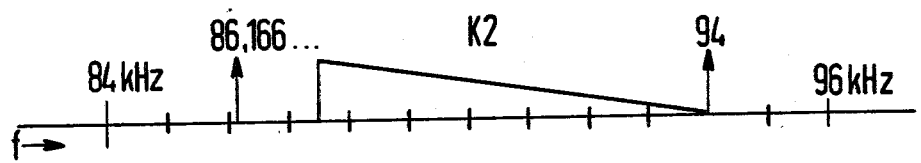
Figure 1:
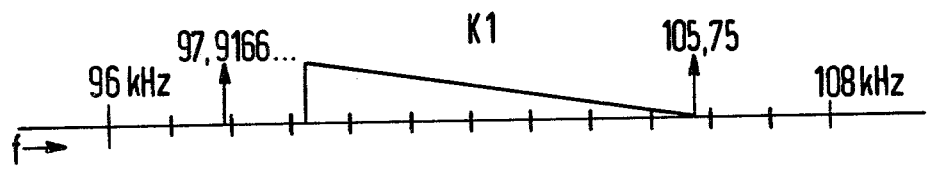

With the aid of the diagram according to FIG. 1 and of the sample embodiments according to FIGS. 2 and 3, the invention is explained more specifically.

FIG. 1 shows a frequency plan in which the transmission of the sound channels occurs in inverted position. The expectedly sharpest demands on the selection filters in the upper channel 1 are held in such a way there that, with 2% frequency gap between pass-band and channel limits, an acceptable expenditure for coil filters occurs. The other channel filters pose somewhat smaller demands.

The carriers 70.5 kHz, 82.25 kHz, 94.0 kHz and 105.75 kHz result from multiplication of the basic frequency (11.75 kHz) by the factors 6 to 9. It is therefore easily possible to derive them from a common quartz frequency (5.922 MHz) by means of frequency division by corresponding factors, with 7 as the greater prime number, for which only a small expenditure in TTL technology is necessary. The pilot for each channel (7833⅓ Hz) is obtained out of the carrier frequency 94.0 kHz upon division by 12. Because of the demonstrated advantages using the quadruple carrier frequencies for the operation of quadrature modulators of 282 kHz, 329 kHz, 376 kHz and 423 kHz are preferred as measureable carrier frequencies, and 23.688 MHz as quartz frequency. Quartz generators in these frequency positions can be sufficiently stabilized without thermostat (error$<2\times10^{-5}$) and can be easily synchronized at the reception-side by means of known AFC circuits. The transmission and reception-side rigid linkage of all carrier and pilot frequencies completely eliminates frequency deviations of the transmission side if only a single one of the four incoming pilots is used at the reception side for the synchronization of the associated quartz generator. In the process, permissible frequency errors of the carrier frequency transmission systems, which said errors are additively homogeneous for a carrier-frequency basic group connection, are also sufficiently decreased, which is to be explained by the example cited. For the transmission station there are produced, with the common basic frequency $f_1 = (11.75$ kHz $\pm \Delta f_1)$, the following carriers and pilots:

Carrier $4 = 6f_1$, Carrier $3 = 7f_1$, Carrier $2 = 8f_1$, Carrier $1 = 9f_1$, Pilot $= \frac{2}{3}f_1$.

At the reception point the following pilots altered by the frequency shift of the carrier-frequency transmission ($\pm \Delta f_T$) are then received in the carrier-frequency positon:

Channel 4 = $16/3 f_1 \pm \Delta f_T$

Channel 3 = $19/3 f_1 \pm \Delta f_T$

Channel 2 = $22/3 f_1 \pm \Delta f_T$

Channel 1 = $25/3 f_1 \pm \Delta f_T$

The reconversion into the LF position occurs similarly on the transmission side by means of carriers which are rigidly linked via the basic frequency $f_2$. The carrier frequency $f_2$ can be determined via an AFC circuit by the pilot in channel 1 or 2 or 3 or 4:

$f_{24} = f_1 \pm 3/16 \Delta f_T$ $f_{23} = f_1 \pm 3/19 \Delta f_T$ $f_{22} = f_1 \pm 3/22 \Delta f_T$ $f_{21} = f_1 \pm 3/25 \Delta f_T$ In the case of demodulation with the carrier frequencies derived herefrom (6, 7, 8 or 9-fold numerical values) different frequency errors occur in the four sound channels, with the four possibilities:

| AFC | Channel 4 | Channel 3 | Channel 2 | Channel 1 |
|---|---|---|---|---|
| Channel 4 | 2/16 ($\Delta f_T$) | 5/16 ($\Delta f_T$) | 8/16 ($\Delta f_T$) | 11/16 ($\Delta f_T$) |
| Channel 3 | 1/19 ($\Delta f_T$) | 2/19 ($\Delta f_T$) | 5/19 ($\Delta f_T$) | 8/19 ($\Delta f_T$) |
| Channel 2 | 4/22 ($\Delta f_T$) | 1/22 ($\Delta f_T$) | 2/22 ($\Delta f_T$) | 5/22 ($\Delta f_T$) |
| Channel 1 | 7/25 ($\Delta f_T$) | 4/25 ($\Delta f_T$) | 1/25 ($\Delta f_T$) | 2/25 ($\Delta f_T$) |

The compilation shows that the frequency offset of 2 Hz permitted for carrier-frequency systems can, in the operation of several channels, always be kept under 0.5 Hz, even if only a single, though suitable channel is operated with AFC.

As sample embodiment for the operation of two sound channels a transmission station is represented in FIG. 2, and a corresponding receiving station in FIG. 3. Therein, 1 contains the input amplifier with level adaptation and pre-emphasis, 2 contains the LF low pass (e.g. 6.4 kHz), 3 contains the transmission amplifier with pilot coupling-in, 4 contains the transmission modulator, 6 the compander according to C.C.I.T.T. Rec. J. 31, 5 or, respectively, 7, simple transmission band-passes with low blocking attenuation. 9 is an amplifier with four inputs for the coupling of a maximum of four channels (sound or telephone, as well) and possibilities of adaptation to the devices of the subsequent carrier-frequency transmisson system. 8 is the generator for producing the pilot and the four carriers. With a similar structure of the receiving station, 10 contains the carrier-frequency reception amplifier with possibilities of adaptation for the feeding carrier-frequency system and four-decoupled outputs for the operation of the maximum of four sound channels. 12 or, respectively, 13 are reception band-passes which are decisive for the channel selection. 6 is the compander, operated here as an expander, with associated level regulation (AGC) via the pilot receiver 15. 14 contains the reception modulator; 2 again contains the LF (audio) low pass and 16 the output amplifier with de-emphasis. Similar to 8 at the transmission point, 11 is a generator for producing the maximum of four demodulation carriers, which said generator in this case is synchronized by one of the maximum of four received pilots.

For the carrier-frequency transmission of the tone channels in standard position a homogeneous structure is possible, but now with a different basic frequency (12.25 kHz) and the factors 5 to 8. Equipment expense and results are similar to the more specifically treated example of the carrier frequency sound transmission in inverted position.

I claim:

1. A carrier-frequency sound transmission system which has sound channels which correspond to approximately the bandwidth of three telephone channels and which are in the frequency of a basic primary frequency group of a carrier frequency communications transmission system, characterized in that the bandwidth of each sound channel is equal to about 7 kHz, a pilot tone is added to each sound channel in the audio frequency range, each sound channel is converted into the carrier-frequency position with the use of identical quadrature modulators such as used in phase relationship single sideband systems, the carrier frequencies are selected such that for conversion to each transmission frequency all of the particular sound channel's signals being transmitted are spaced in frequency more than 1 kHz from the adjacent sound channels or pilot tones.

2. A carrier-frequency sound transmission system according to claim 1, characterized in that all required pilots and carrier frequencies are derived from a first quartz crystal controlled generator of the transmitter, and that one of the derived pilots serves for synchronization of a second quartz crystal generator at the receiver.

3. A carrier-frequency sound transmission system according to claim 2, characterized in that a maximum of four sound channels are transmitted at carrier frequencies of 70.5 kHz, 82.25 kHz, 94.0 kHz and 105.75 kHz, and the frequency of the pilot is 7833⅓ Hz.

* * * * *